(12) United States Patent
Ohtomo (10) Patent No.: US 8,427,103 B2
(45) Date of Patent: Apr. 23, 2013

(54) CHARGING DEVICE FOR ELECTRIC VEHICLE

(75) Inventor: Yosuke Ohtomo, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 289 days.

(21) Appl. No.: 12/232,578

(22) Filed: Sep. 19, 2008

(65) Prior Publication Data

US 2009/0079389 A1 Mar. 26, 2009

(30) Foreign Application Priority Data

Sep. 21, 2007 (JP) ................. 2007-244748

(51) Int. Cl.
*H02J 7/00* (2006.01)
(52) U.S. Cl.
USPC .......................... 320/109; 439/133
(58) Field of Classification Search ........... 320/109, 320/138
See application file for complete search history.

(56) References Cited

U.S. PATENT DOCUMENTS

| | | | | |
|---|---|---|---|---|
| 5,202,617 A | * | 4/1993 | Nor | 320/130 |
| 5,283,513 A | * | 2/1994 | Fujita et al. | 320/138 |
| 5,545,046 A | | 8/1996 | Masuda et al. | |
| 5,548,200 A | * | 8/1996 | Nor et al. | 320/109 |
| 5,627,448 A | * | 5/1997 | Okada et al. | 439/133 |
| 5,640,076 A | | 6/1997 | Youn | |
| 6,087,805 A | * | 7/2000 | Langston et al. | 320/109 |
| 6,104,160 A | | 8/2000 | Iwata et al. | |
| 6,114,833 A | * | 9/2000 | Langston et al. | 320/109 |
| 6,459,234 B2 | * | 10/2002 | Kajiura | 320/109 |
| 6,956,357 B2 | * | 10/2005 | Nagai et al. | 320/148 |

FOREIGN PATENT DOCUMENTS

| | | |
|---|---|---|
| JP | 01-090203 | 6/1989 |
| JP | 04-299029 A | 10/1992 |
| JP | 11-178234 | 7/1999 |

OTHER PUBLICATIONS

European Search Report Dated Nov. 24, 2008.

* cited by examiner

*Primary Examiner* — Ramy Ramadan
(74) *Attorney, Agent, or Firm* — McGinn IP Law Group, PLLC (57) ABSTRACT

The present invention provides a charging device for an electric vehicle with which optimal charging can be performed reliably when charging a storage device of the electric vehicle, without performing fast charging and normal charging at the same time.

10 Claims, 7 Drawing Sheets

CHARGING DEVICE FOR ELECTRIC VEHICLE

CROSS-REFERENCE TO RELATED APPLICATIONS

The disclosure of Japanese Patent Application No. 2007-244748, filed on Sep. 21, 2007 including the specification, drawings and abstract is incorporated herein by reference in its entirety.

BACKGROUND OF THE INVENTION

1. Field of the Invention

The present invention relates to a charging device for an electric vehicle, which charges a storage device that supplies electric power to an electric motor for driving a vehicle.

2. Description of the Related Art

Electric vehicles include vehicles that use an electric motor alone as a drive source and hybrid vehicles that uses an electric motor and an engine as drive sources. Both types of electric vehicle include a battery serving as a storage device for supplying electric power to the electric motor, and when the remaining capacity of the battery decreases, the battery must be charged externally. Further, in a hybrid vehicle that uses both an electric motor and an engine as drive sources, the battery is usually charged by driving the engine, but occasionally the battery is charged by supplying electric power from an external power source, without driving the engine. When the battery is charged externally in this manner in an electric vehicle having an electric motor, including a hybrid vehicle, an on-board charger that raises the voltage of a household commercial power source and converts this voltage into direct-current power is installed in the electric vehicle so that the storage device can be charged using a commercial power source.

However, several hours are required to charge the storage device to a high voltage of up to approximately DC 400V, for example, by connecting a power source plug, or in other words an outlet, of an AC 100V or AC 200V household commercial power source to the vehicle body, and since this amount of time is excessive, an electric vehicle suffers greatly in terms of user-friendliness in comparison with a gasoline vehicle having a fuel tank that can be filled in a short period of time at a gas station.

Therefore, in recent years progress has been made in the development of a high-speed charger, or in other words a fast charger, that can fully charge a storage device for an electric vehicle in a short time period of approximately several tens of minutes using specialist facilities. Considering the prevalence of high-speed chargers and the user-friendliness of electric vehicles, however, it is preferable in reality to ensure that charging can also be performed from a household commercial power source. Note that Japanese Unexamined Patent Application Publication H11-178234 describes an electric vehicle in which a non-board battery is charged from a household power source.

To enable charging using both a high-speed charger and a commercial power source, a vehicle body is provided with a high-speed charging connector to which a power supply plug of a high-speed charger is connected so that the on-board battery can be charged using the high-speed charger, and a normal charging connector to which a power source plug is connected so that the on-board battery can be charged using a household commercial power source. However, different charging modes are used during high-speed charging and normal charging, and the method of charging the on-board battery differs between the two modes. Therefore, charging using both methods at the same time, which occurs when both the power supply plug and the power source plug are connected to the vehicle body, is preferably avoided.

Nevertheless, when both the high-speed charging connector and the normal charging connector are provided on the vehicle body, a user may mistakenly connect the power supply plug of the high-speed charger and the normal charging power source plug at the same time.

SUMMARY OF THE INVENTION

An object of the present invention is to provide a charging device for an electric vehicle with which optimum charging is performed reliably, without performing high-speed charging and normal charging at the same time, when charging a storage device of the electric vehicle.

A charging device for an electric vehicle according to the present invention charges a storage device for supplying electric power to an electric motor for driving a vehicle, and includes a first charging circuit for charging electric power supplied from an external power source to the storage device via an on-board charger and a second charging circuit for charging electric power supplied from an external charger to the storage device without passing through the on-board charger. The charging device comprises: a first connection terminal connected to the first charging circuit, which establishes a connection with the external power source; a second connection terminal connected to the second charging circuit, which establishes a connection with the external charger and has a different shape to the first connection terminal; and charging system switching means for charging the storage device from only one of the first charging circuit and the second charging circuit and preventing simultaneous charging from both the first charging circuit and the second charging circuit.

In the charging device for an electric vehicle according to the present invention, when the external power source is connected to the first connection terminal and the external charger is connected to the second connection terminal, the charging system switching means activate the connection terminal connected first such that the charging device is charged through the charging circuit having the connection terminal connected first.

In the charging device for an electric vehicle according to the present invention, when the external power source is connected to the first connection terminal and the external charger is connected to the second connection terminal, the charging system switching means activate the charging circuit having a shorter total charging time, from among the first charging circuit and the second charging circuit, such that the charging device is charged through the charging circuit having the shorter total charging time.

In the charging device for an electric vehicle according to the present invention, the charging system switching means are constituted by an aggregate connection terminal in which the first connection terminal and the second connection terminal are disposed collectively such that the charging system switching means are incapable of connecting a power source terminal of the external power source to the first connection terminal and connecting a power supply terminal of the external charger to the second connection terminal simultaneously. Also in the charging device for an electric vehicle according to the present invention, a power source plug having the power source terminal covers the second connection terminal when the power source terminal is connected to the first connection terminal, and a power supply plug having the power supply terminal covers the first connection terminal when the power supply terminal is connected to the second connection terminal.

According to the present invention, the charging system switching means charge the storage device from only one of the first and second charging circuits and prevent simultaneous charging from both circuits. Therefore, even when the electric vehicle is provided with both a fast charging connection terminal to which a power supply plug of a fast charger is connected and a normal charging connection terminal to which an external power source for supplying electric power to an on-board charger is connected, the storage device is invariably charged via a single charging circuit. Hence, simultaneous fast charging and normal charging can be prevented and optimum charging can be performed, enabling an improvement in the charging operability of the electric vehicle.

When the fast charging connection terminal and the normal charging connection terminal are provided separately in the vehicle body and both the power source plug and the power supply plug are connected to the respective connection terminals, simultaneous charging through both of the charging circuits is prevented by prioritizing either the charging circuit having the connection terminal that was connected first or the charging circuit having the shorter total charging time. When the vehicle body is provided with an aggregate connection terminal in which the fast charging connection terminal and the normal charging connection terminal are provided collectively, simultaneous charging through both of the charging circuits is prevented by ensuring that only one of the power source plug and the power supply plug can be connected to the aggregate connection terminal at a time.

DESCRIPTION OF THE PREFERRED
EMBODIMENTS

Figure 1:
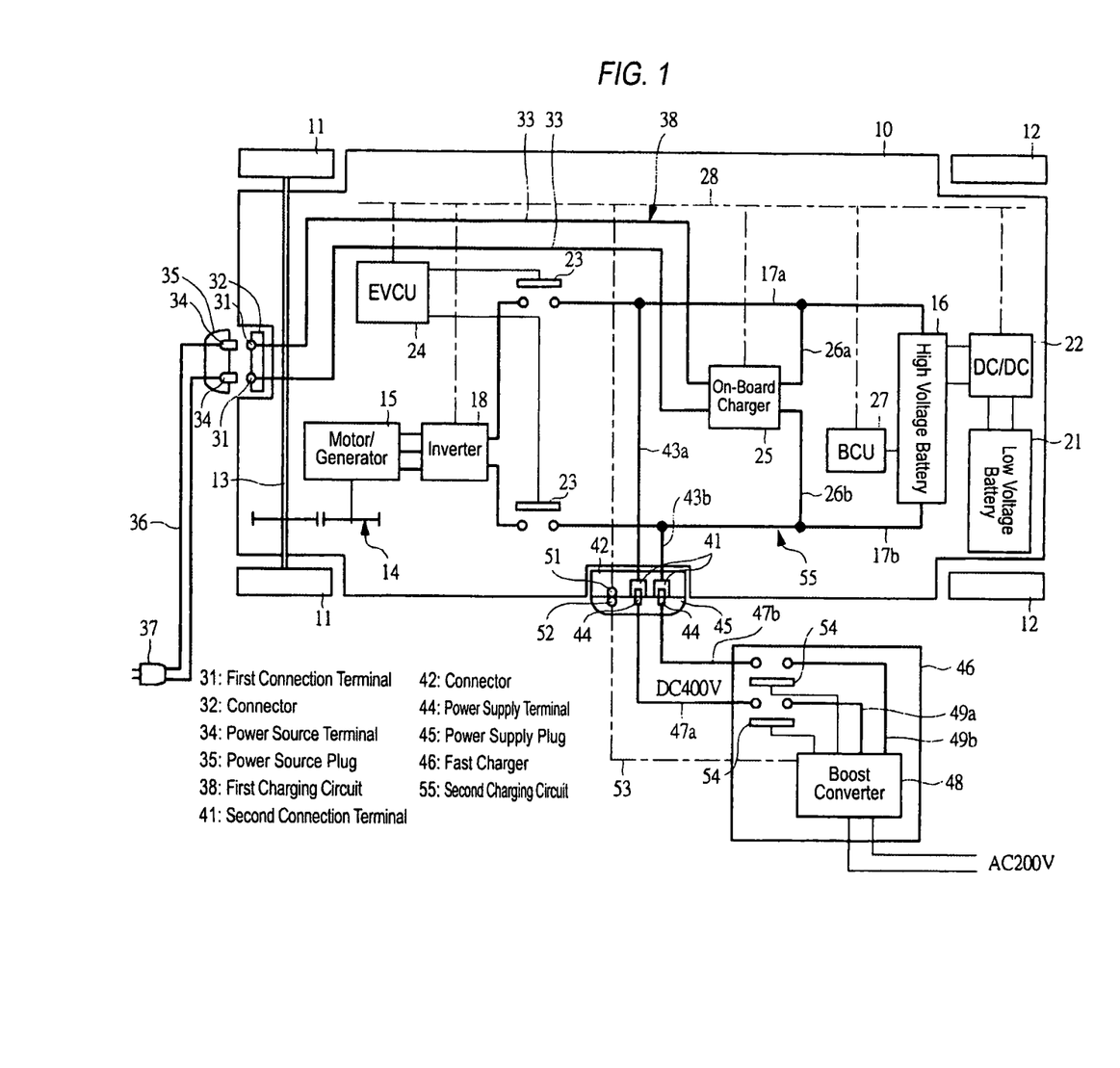
FIG. 1 is a schematic diagram showing an electric vehicle having a charging device serving as an embodiment of the present invention.

Embodiments of the present invention will be described in detail below on the basis of the drawings. FIG. 1 is a schematic diagram showing an electric vehicle having a charging device serving as an embodiment of the present invention.

A vehicle body 10 of this electric vehicle is provided with drive wheel side front wheels 11 and driven wheel side rear wheels 12, and a motor/generator 15 is connected to a drive shaft 13 for driving the front wheels 11 via a pair of gears 14 having a fixed gear ratio. The motor/generator 15, which serves as an electric motor for driving the vehicle, is a three-phase alternating current synchronous motor, and a high voltage battery 16 for supplying electric power to the motor/generator 15 is installed in the vehicle body 10 as a storage device. The high voltage battery 16 employs a lithium ion battery, i.e. a secondary battery, and outputs direct current power of 400V, for example.

The high voltage battery 16 is connected to an inverter 18 via power supply cables 17a, 17b. The inverter 18 converts a direct current from the high voltage battery 16 into a three-phase alternating current and supplies power to the motor/generator 15. The motor/generator 15 has a function for recovering regenerative energy by generating power during braking of the vehicle and charging the high voltage battery 16 with this generated power. A low voltage battery 21 is also installed in the vehicle body 10 for supplying 12V direct current power, for example, to low voltage devices installed in the vehicle such as audio devices and air-conditioning fans. The low voltage battery 21 is charged by reducing the voltage of the high voltage battery 16 using a DC/DC converter 22.

The power supply cables 17a, 17b are provided with a main relay 23 for switching the high voltage battery 16 and the inverter 18 between a connected state and a disconnected state. The main relay 23 performs a switching operation in accordance with a drive signal from a vehicle control unit (EVCU) 24.

An on-board charger 25 is installed in the vehicle body 10 so that the high voltage battery 16 can be charged using an external power source such as a commercial power source, and an output terminal of the on-board charger 25 is connected to the high voltage battery 16 via the power supply cables 17a, 17b by output cables 26a, 26b. The on-board charger 25 charges the high voltage battery 16 by increasing the voltage of an AC 100V or AC 200V external power source, for example, and converting this voltage into a 400V direct current, for example. A battery control unit (BCU) 27 is connected to the high voltage battery 16, and the battery control unit 27, on-board charger 25, inverter 18, vehicle control unit 24, and DC/DC converter 22 are connected to each other by a communication network 28, i.e. a CAN (car area network), so as to be capable of exchanging information. Information such as the voltage and remaining capacity of the high voltage battery 16, for example, is transmitted to the vehicle control unit 24 via the communication network 28. The vehicle control unit 24 and battery control unit 27 include a CPU for calculating control signals, ROM for storing control programs, calculation equations, map data, and so on, and RAM for storing data temporarily.

A connector 32 having first connection terminals 31 is provided on a front end portion of the vehicle body 10, and the connection terminals 31 of the connector 32 are connected to the on-board charger 25 by respective power supply cables 33. A power source plug 35 having power source terminals 34 connected respectively to the connection terminals 31 is attached to the connector 32 detachably. The power source plug 35 is connected to a connection plug 37 via power supply cables 36, and the connection plug 37 is attached to an external power source terminal detachably. Hence, when the external power source terminal is electrically connected to the on-board charger 25 by connecting the power source plug 35 to the connector 32 and connecting the connection plug 37 to the external power source terminal, or in other words a normal charging power source, a signal is transmitted from the on-board charger 25 to the vehicle control unit 24 via the communication network 28, and charging is performed on the high voltage battery 16.

A circuit portion connecting the connector 32 to the high voltage battery 16 via the power supply cables 33, the on-board charger 25, the output cables 26a, 26b, and the power supply cables 17a, 17b constitutes a first charging circuit 38 for charging power supplied from the external power source to the high voltage battery 16 via the on-board charger 25, and when the power source plug 35 is connected to the connector 32, the on-board charger 25 charges the high voltage battery 16 via the first charging circuit 38 in a normal charging mode.

A connector 42 having second connection terminals 41 is provided on one side face of a rear portion side of the vehicle body 10, and the connection terminals 41 of the connector 42 are connected directly to the power supply cables 17a, 17b by respective power supply cables 43a, 43b. A power supply plug 45 having power supply terminals 44 connected respectively to the connection terminals 41 is attached to the connector 42 detachably. The power supply terminals 44 of the power supply plug 45 are connected to output terminals of a fast charger 46 serving as an external charger via power supply cables 47a, 47b, and the fast charger 46 includes a boost converter 48 that boosts an alternating current supplied from the external power source and converts the boosted alternating current into a 400V direct current, for example.

The connector 42 is provided with a signal terminal 51 that is connected to the vehicle control unit 24 by a communication line, and the power supply plug 45 is provided with a signal terminal 52 that is connected to the signal terminal 51 when the power supply plug 45 is attached to the connector 42. The signal terminal 52 is connected to the boost converter 48 by a signal line 53. Hence, when the power supply plug 45 is attached to the connector 42, a signal is transmitted to the vehicle control unit 24 via the signal line 53, and relays 54 provided on output lines 49a, 49b of the boost converter 48 are driven by a signal from the vehicle control unit 24 such that charging is performed on the high voltage battery 16 by the fast charger 46.

A circuit portion connecting the connector 42 to the high voltage battery 16 via the power supply cables 43a, 43b, 17a, and 17b constitutes a second charging circuit 55 for charging the high voltage battery 16 with power supplied from the fast charger 46 serving as an external charger without passing through the on-board charger 25, and when the power supply plug 45 is connected to the connector 42, the external fast charger 46 charges the high voltage battery 16 via the second charging circuit 55 in a high speed charging mode.

Figure 2:
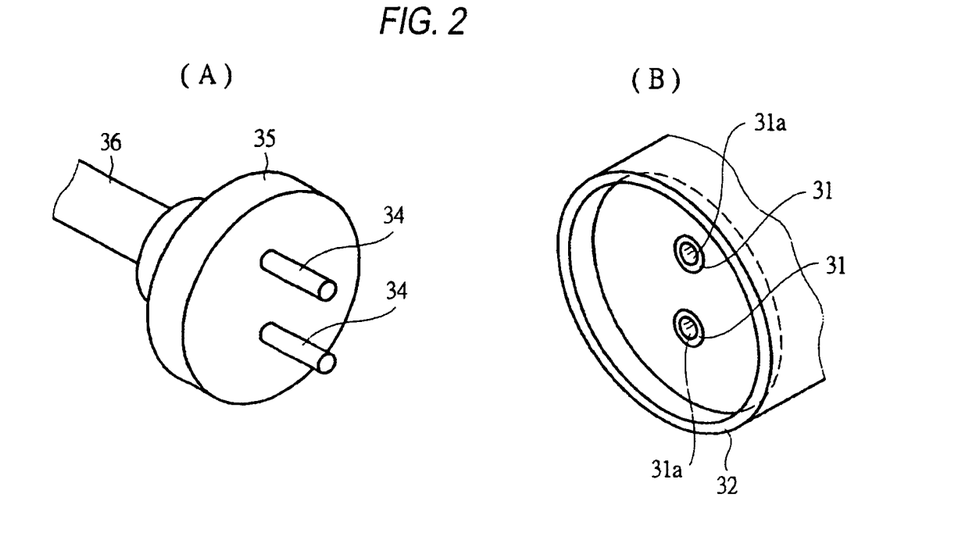
FIG. 2A is a perspective view showing an example of a power source plug.
FIG. 2B is a perspective view showing a connector to which the power source plug is attached.

FIG. 2A is a perspective view showing an example of the power source plug 35, and FIG. 2B is a perspective view showing the connector 32 to which the power source plug 35 is attached. As shown in FIG. 2A, the two power source terminals 34 provided on the power source plug 35 are each formed from a pole-shaped metallic material having a circular cross-section. As shown in FIG. 2B, the connection terminals 31 of the connector 32 provided in the vehicle body 10 are formed with fitting holes 31a corresponding to the power source terminals 34, into which the pole-shaped power source terminals 34 are fitted.

Figure 3:
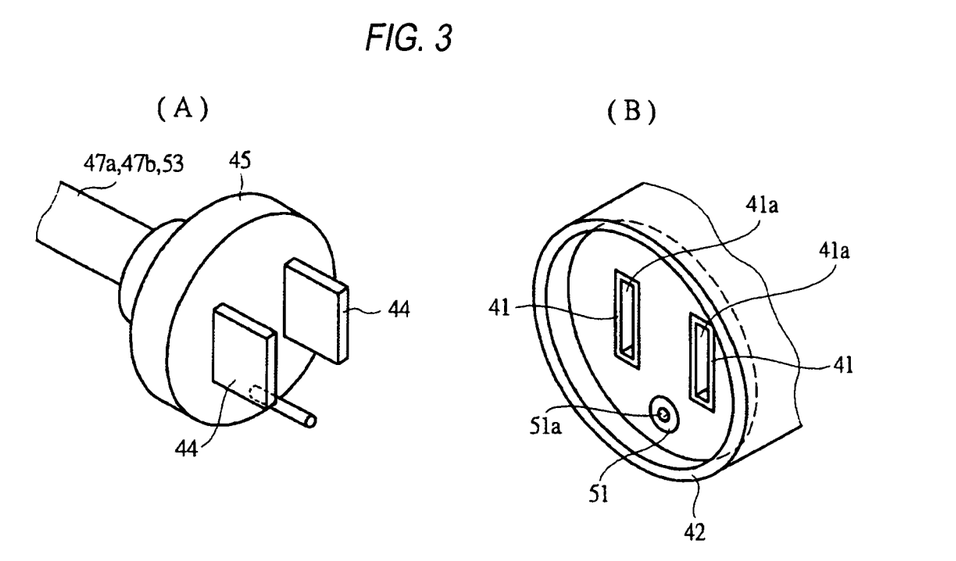
FIG. 3A is a perspective view showing an example of a power supply plug.
FIG. 3B is a perspective view showing a connector to which the power supply plug is attached.

FIG. 3A is a perspective view showing an example of the power supply plug 45, and FIG. 3B is a perspective view showing the connector 42 to which the power supply plug 45 is attached. As shown in FIG. 3A, the two power supply terminals 44 provided on the power supply plug 45 are each formed from a plate-shaped metallic material having a square cross-section, in contrast to the power source terminals 34, and the signal terminal 52 is formed from a pole-shaped metallic material having a circular cross-section. As shown in FIG. 3B, the connection terminals 41 and the signal terminal 51 of the connector 42 provided in the vehicle body 10 are formed with fitting holes 41a, 51a corresponding to the power supply terminals 44 and the signal terminal 52, into which the power supply terminals 44 and the signal terminal 52 are respectively fitted.

Since the connection terminal 31 and the connection terminal 41 have different shapes, the power source terminal 34 of the power source plug 35 cannot be connected to the connection terminal 41, and the power supply terminal 44 of the power supply plug 45 cannot be connected to the connection terminal 31. Note, however, that the respective shapes of the connection terminals 31, 41 are not limited to the illustrated cases, and may be set arbitrarily as long as they differ from each other such that the power source terminal 34 of the power source plug 35 can only be connected to the connection terminal 31 and the power supply terminal 44 of the power supply plug 45 can only be connected to the connection terminal 41.

Figure 4:
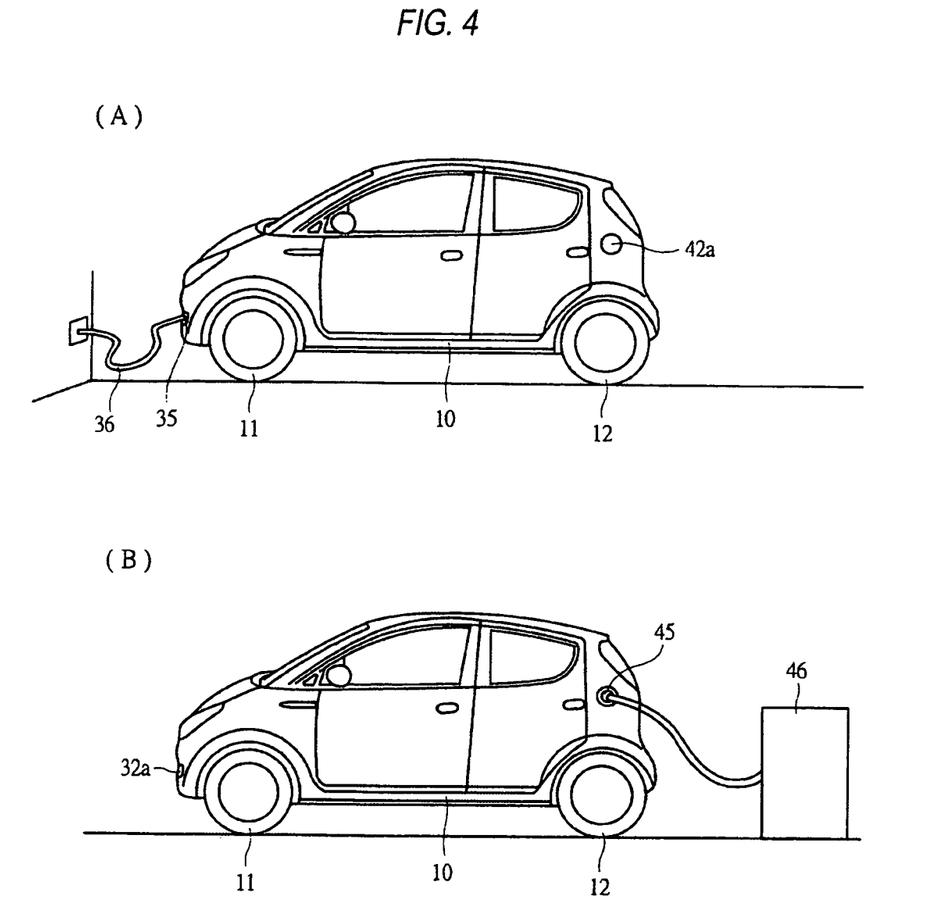
FIG. 4A is a front view showing the electric vehicle in a state where a high voltage battery is charged from an external power source terminal via an on-board charger.
FIG. 4B is a front view showing the electric vehicle in a state where the high voltage battery is charged directly from a fast charger.

FIG. 4A is a front view showing the electric vehicle in a state where the high voltage battery is charged from the external power source terminal via the on-board charger 25 by attaching the power source plug 35 to the connector 32, and FIG. 4B is a front view showing the electric vehicle in a state where the high voltage battery 16 is charged directly from the fast charger 46 serving as an external charger by attaching the power supply plug 45 to the connector 42. As shown in FIG. 4, the vehicle 10 is provided with connector lid members 32a, 42a covering the connectors 32, 42 such that when the power source plug 35 is attached to the connector 32, the lid member 32a open, and when the power supply plug 45 is attached to the connector 42, the lid member 42a is open.

As shown in FIGS. 1 to 4, the two connectors 32, 42 are provided at a remove from each other such that the power source plug 35 can be attached to the connector 32 and the power supply plug 45 can be attached to the connector 42. Measures must be taken to ensure that when the power source plug 35 and the power supply plug 45 are both connected to the respective connectors 32, 42, the normal charging mode and the high speed charging mode, which are different to each other, are not performed simultaneously. When the power source plug 35 is attached to the connector 32, information is transmitted from the on-board charger 25 to the vehicle control unit 24 via the communication network 28, and similarly, when the power supply plug 45 is attached to the connector 42, information is transmitted from the fast charger 46 to the vehicle control unit 24 via the signal line 53 and the communication network 28.

On the basis of this information, when the power source plug 35 and the power supply plug 45 are both attached to the two connectors 32, 42, the vehicle control unit 24 charges the high voltage battery 16 from only one of the first charging circuit 38 and the second charging circuit 55 and prevents charging of the high voltage battery 16 from both of the charging circuits at the same time. Thus, the vehicle control unit 24 shown in FIG. 1 constitutes charging system switching means. As a method of determining which of the two charging circuits 38, 55 is to be activated, the plug that is connected first between the power source plug 35 and the power supply plug 45 may be activated such that the high voltage battery 16 is charged by the charging circuit having the connection terminal to which the plug was connected first. As another determination method, the charging circuit having a shorter total charging time between the two charging circuits 38, 55 may be activated such that the high voltage battery 16 is charged by the charging circuit having the shorter total charging time. In this method, the remaining capacity of the high voltage battery 16 is calculated, the charging time when charging is performed using the fast charger 46 is compared to the charging time when charging is performed using the on-board charger 25, and the high voltage battery 16 is charged in the charging mode having the shorter charging time.

Figure 5:
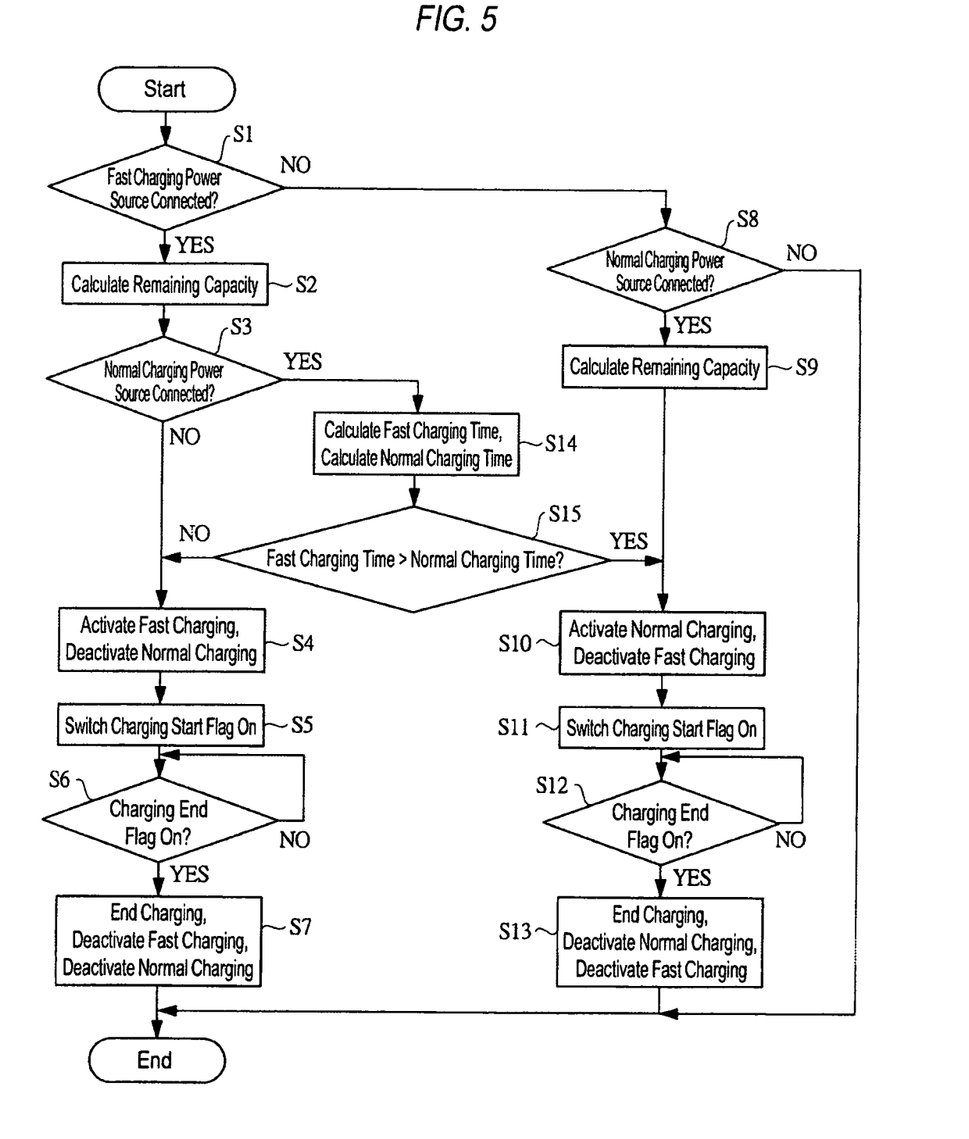
FIG. 5 is a flowchart showing an algorithm for determining a charging mode switch.

FIG. 5 is a flowchart showing an algorithm for determining a charging mode switch. In a step S1, a determination is made as to whether or not the power supply terminal 44 of the power supply plug 45 is connected to the connection terminal 41 of the connector 42 such that the fast charging power source is connected, or in other words whether or not the fast charger 46 is connected. When the fast charger 46 is connected, the remaining capacity of the high voltage battery 16 is calculated in a step S2, whereupon a determination is made in a step S3 as to whether or not the normal charging power source is connected, or in other words whether or not the power source plug 35 is connected to the connector 32. When it is determined in the step S3 that the normal charging power source is not connected, setting is performed in a step S4 to activate fast charging and deactivate normal charging, whereupon a charging start flag is switched ON in a step S5 to begin charging using the fast charger 46. Charging using the fast charger 46 is continued until a charging end flag is switched ON in a step S6. When the charging end flag is switched ON in the step S6, charging is stopped in a step S7, whereby fast charging is deactivated and normal charging is maintained in a deactivated state.

On the other hand, when it is determined that the fast charger 46 is not connected in the step S1 and that the normal charging power source is connected in a step S8, the remaining capacity of the high voltage battery 16 is calculated in a step S9, whereupon setting is performed in a step S10 to activate normal charging and deactivate fast charging. The charging start flag is then switched ON in a step S11 to begin normal charging using the on-board charger 25. Charging using the on-board charger 25 is continued until the charging end flag is switched ON in a step S12. When the charging end flag is switched ON in a step S13, charging is stopped in a step S13, whereby normal charging is deactivated and fast charging is set to a deactivated state.

When it is determined in the step S3 that the fast charger 46 and the normal charging power source are connected, i.e. when the power source plug 35 is connected to the connector 32 while being connected to an external power source and the power supply plug 45 of the fast charger 46 is connected to the connector 42, the fast charging time and the normal charging time are calculated in a step S14, whereupon the shorter of the fast charging time and the normal charging time is determined in a step S15. When it is determined in the step S15 that the fast charging time is shorter than the normal charging time, fast charging is determined to be active in the step S4, whereupon the steps S5 to S7 are executed. When it is determined in the step S15 that the normal charging time is shorter than the fast charging time, on the other hand, normal charging is determined to be active in the step S10, whereupon the steps S11 to S13 are executed. Note that a charging preparation time is added to the calculation of the respective charging times in the step S15.

As a method of determining which of the two charging circuits 38, 55 to activate, in the method for activating the plug connected first between the power source plug 35 and the power supply plug 45 and charging the high voltage battery 16 using the charging circuit having the connection terminal to which the plug was connected first, the charging start flag for activating fast charging is switched ON when the fast charger 46 is connected, and when the normal charging power source is connected in this state, the charging start flag is switched ON. In so doing, charging using the normal charging power source is prevented.

Figure 6:
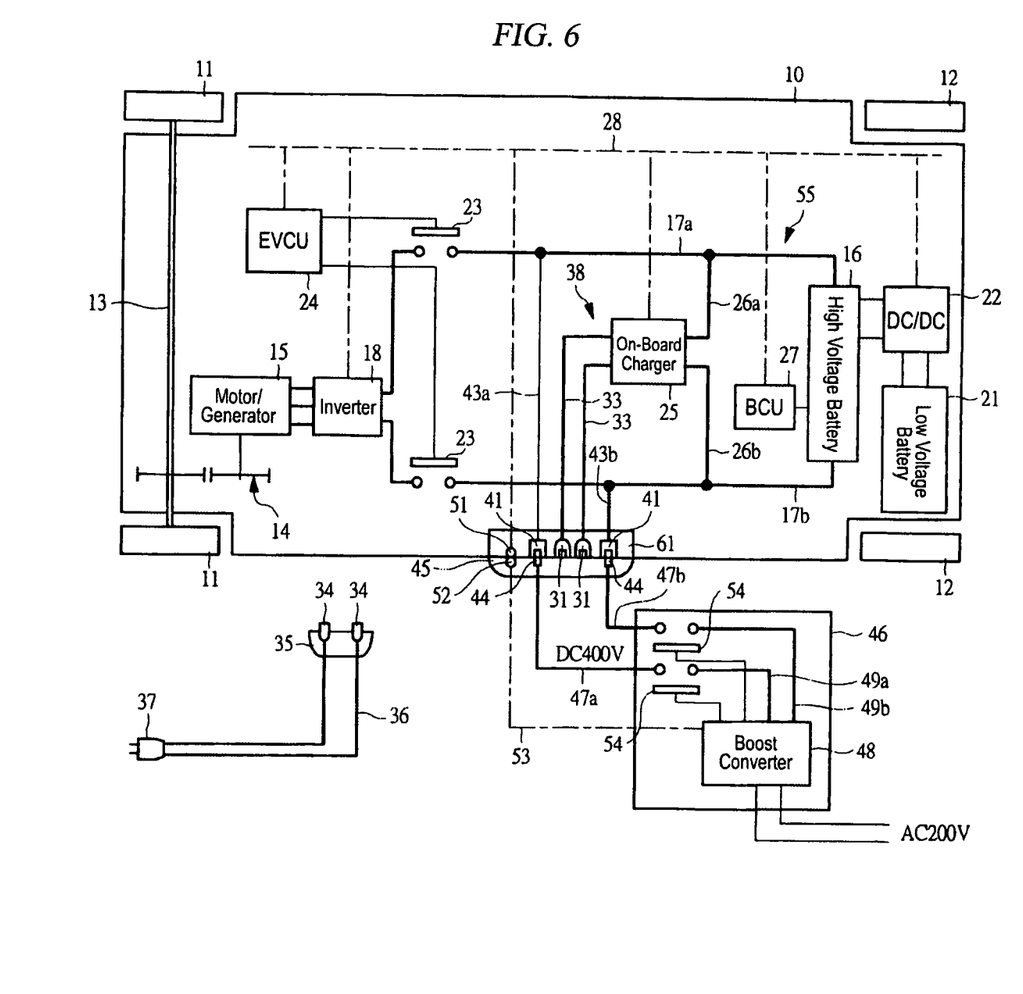
FIG. 6 is a schematic diagram showing an electric vehicle having a charging device according to another embodiment of the present invention.

FIG. 6 is a schematic diagram showing an electric vehicle having a charging device according to another embodiment of the present invention. In FIG. 6, identical members to those shown in FIG. 1 have been allocated identical reference symbols.

An aggregate connector 61 is provided on one side face of the rear end portion side of the vehicle body 10, for example, and the first connection terminals 31, which are connected to the on-board charger 25 via the power supply cables 33, and the second connection terminals 41, which are connected to the power supply cables 17*a*, 17*b* via the power supply cables 43*a*, 43*b*, are disposed collectively in the aggregate connector 61. By means of these connection terminals, an aggregate connection terminal is formed. Further, the aggregate connector 61 is provided with the signal terminal 51, which is connected to the vehicle control unit 24 by a communication line.

The power source plug 35 provided with the connection plug 37, which is connected detachably to an external power source terminal, takes the shape shown in FIG. 2A, while the power supply plug 45 connected to the output terminal of the fast charger 46 via the power supply cables 47*a*, 47*b* takes the shape shown in FIG. 3A. Hence, the power source terminal 34 of the power source plug 35 and the power supply terminal 43 of the power supply plug 45 are shaped differently.

Figure 7:
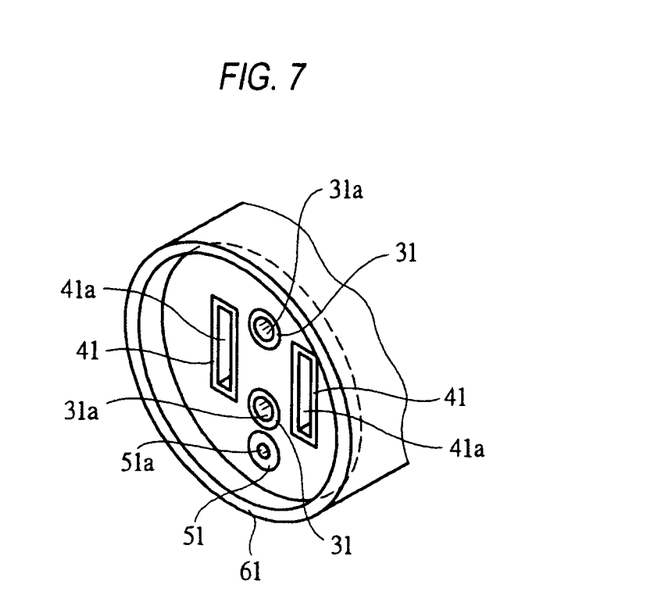
FIG. 7 is a perspective view showing an aggregate connector shown in FIG. 6.

FIG. 7 is a perspective view showing the aggregate connector 61 shown in FIG. 6. The aggregate connector 61 is formed in such a size and shape that when one of the power source plug 35 of the external power source and the power supply plug 45 of the fast charger 46 is connected thereto, the other cannot be connected. In other words, the size of the aggregate connector 61 substantially corresponds to the size of the respective plugs.

As shown in FIG. 7, the connection terminals 31 provided on the aggregate connector 61 are formed with the fitting holes 31*a* into which the pole-shaped power source terminals 34 are fitted, while the connection terminals 41 and the signal terminal 51 provided on the aggregate connector 61 are formed with the fitting holes 41*a*, 51*a* into which the plate-form power supply terminals 44 and the pole-shaped signal terminal 52 are respectively fitted. Hence, the respective fitting holes 31*a*, 41*a*, 51*a* have different shapes and are formed at an offset from one another. Therefore, when the power source plug 35 is attached to the aggregate connector 61 to connect the connection terminals 31 to the power source terminals 34, the connection terminals 41 and the signal terminal 51 are covered by the power source plug 35, and on the basis of this state, the power supply plug 45 cannot be attached to the aggregate connector 61. Similarly, when the power supply plug 45 is attached to the aggregate connector 61 to connect the connection terminals 41 to the power supply terminals 44, the connection terminals 31 are covered by the power supply plug 45, and on the basis of this state, the power source plug 35 cannot be attached to the aggregate connector 61.

When the power source plug 35 is attached to the aggregate connector 61, power supplied from the external power source is charged to the high voltage battery 16 through the connection terminals 31 via the first charging circuit 38. When the power supply plug 45 is attached to the aggregate connector 61, on the other hand, power supplied from the fast charger 46 is charged to the high voltage battery 16 through the connection terminals 41 via the second charging circuit 55. Thus, the aggregate connector 61 charges the high voltage battery 16 from only one of the two charging circuits 38, 55, and therefore constitutes charging system switching means for preventing simultaneous charging from both charging circuits 38, 55. As described above, the aggregate connector 61 serving as charging system switching means constitutes an aggregate connection terminal that is incapable of connecting the power source terminals 34 of the external power source to the connection terminals 31 and connecting the power supply terminals 44 of the fast charger 46 to the connection terminals 41 at the same time.

When the power source plug 35 is connected, the output of the on-board charger 25 is controlled on the basis of information transmitted from the on-board charger 25 to the vehicle control unit 24, and when the power supply plug 45 is connected, the output of the boost converter 48 is controlled on the basis of information transmitted from the boost converter 48 to the vehicle control unit 24.

The present invention is not limited to the embodiments described above, and may be subjected to various modifications within a scope that does not depart from the spirit thereof. For example, the positions of the respective connectors 32, 42 are not limited to the positions shown in FIG. 4, and the position of the aggregate connector 61 is not limited to the position described above. Instead, the connector 32 may be provided on the rear end portion of the vehicle. Further, in the illustrated electric vehicle, the front wheels 11 serve as drive wheels, but the rear wheels 12 may also be drive wheels. Moreover, a lithium ion battery is used as the high voltage battery 16, but another type of secondary battery, for example an electrochemical capacitor such as an electric double layer capacitor, may be used instead. Furthermore, an electric vehicle in which an electric motor serves as the sole drive source was described in the above embodiments, but the present invention may also be applied to a hybrid-type electric vehicle having an engine in addition to an electric motor.

What is claimed is:

1. A charging device for an electric vehicle, which charges a storage device for supplying electric power to an electric motor for driving the electric vehicle, and includes a first charging circuit for charging electric power supplied from an external power source to said storage device via an on-board charger and a second charging circuit for charging electric power supplied from an external charger to said storage device without passing through said on-board charger, said charging device comprising:
   a first connection terminal connected to said first charging circuit, which establishes a connection with said external power source;
   a second connection terminal connected to said second charging circuit, which establishes a connection with said external charger and has a different shape to said first connection terminal and includes a signal terminal for supplying a signal and a power terminal for supplying the charging electric power from the external charger; and
   a charging system switching control circuit for charging said storage device, such that the charging system switching control circuit is configured so as to activate one of the first connection terminal and the second connection terminal based at least partially on a determination that the first connection terminal is connected to said external power source and the second connection terminal is connected to said external charger so as to charge the storage device from only one of said first charging circuit and said second charging circuit and preventing simultaneous charging from both said first charging circuit and said second charging circuit,
   wherein, when said external power source is connected to said first connection terminal and said external charger is connected to said second connection terminal, the charging system switching control circuit activates one of the first connection terminal and the second connection terminal based at least partially on the signal from the signal terminal.

2. A charging device for an electric vehicle, which charges a storage device for supplying electric power to an electric motor for driving the electric vehicle, and includes a first charging circuit for charging electric power supplied from an external power source to said storage device via an on-board charger and a second charging circuit for charging electric power supplied from an external charger to said storage device without passing through said on-board charger, said charging device comprising:
   a first connection terminal connected to said first charging circuit, which establishes a connection with said external power source;
   a second connection terminal connected to said second charging circuit, which establishes a connection with said external charger and has a different shape to said first connection terminal; and
   charging system switching means for charging said storage device from only one of said first charging circuit and said second charging circuit and preventing simultaneous charging from both said first charging circuit and said second charging circuit,
   wherein, when said external power source is connected to said first connection terminal and said external charger is connected to said second connection terminal, said charging system switching means activates the connection terminal connected first such that said charging device is charged by the charging circuit having the connection terminal connected first.

3. A charging device for an electric vehicle, which charges a storage device for supplying electric power to an electric motor for driving the electric vehicle, and includes a first charging circuit for charging electric power supplied from an external power source to said storage device via an on-board charger and a second charging circuit for charging electric power supplied from an external charger to said storage device without passing through said on-board charger, said charging device comprising:
   a first connection terminal connected to said first charging circuit, which establishes a connection with said external power source;
   a second connection terminal connected to said second charging circuit, which establishes a connection with said external charger and has a different shape to said first connection terminal; and
   charging system switching means for charging said storage device from only one of said first charging circuit and said second charging circuit and preventing simultaneous charging from both said first charging circuit and said second charging circuit,
   wherein, when said external power source is connected to said first connection terminal and said external charger is connected to said second connection terminal, said charging system switching means activates the charging circuit having a shorter total charging time, from among said first charging circuit and said second charging circuit, such that said charging device is charged by the charging circuit having the shorter total charging time.

4. The charging device for an electric vehicle according to claim 1, wherein the charging system switching control circuit electrically activates one of said first charging circuit and said second charging circuit based on a predetermined criterion.

5. The charging device for an electric vehicle according to claim 1, wherein the first connection terminal and the second connection terminal are disposed so as enable the first connection terminal and the second connection terminal to be connected to said external power source and said external charger, respectively, simultaneously.

6. The charging device for an electric vehicle according to claim 1, wherein the charging system switching control circuit comprises a vehicle control unit.

7. The charging device for an electric vehicle according to claim 1, wherein the charging system switching control circuit comprises an electrical switching means for selecting one of said first charging circuit and said second charging circuit.

8. The charging device for an electric vehicle according to claim 1, wherein the charging system switching control circuit activates one of said first charging circuit and said second charging circuit when the first connection terminal is connected to the external power source and the second connection terminal is connected to the external charger.

9. The charging device for an electric vehicle according to claim 1, wherein the determination is based at least partially on a signal indicating that the first connection terminal is connected to the external power source and a signal indicating that the second connection terminal is connected to the external charger.

10. The charging device for an electric vehicle according to claim 1, wherein the charging system switching control circuit activates one of the first connection terminal and the second connection terminal based at least partially on a factor other than the determination that the first connection terminal is connected to said external power source and the second connection terminal is connected to said external charger.

* * * * *